US 9,102,283 B2

(12) United States Patent
O'Neal

(10) Patent No.: US 9,102,283 B2
(45) Date of Patent: Aug. 11, 2015

(54) AUDIO SPEAKER CABINET

(71) Applicant: Nissan North America, Inc., Franklin, TN (US)

(72) Inventor: Kenneth Brian O'Neal, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 85 days.

(21) Appl. No.: 14/102,939

(22) Filed: Dec. 11, 2013

(65) Prior Publication Data

US 2015/0158432 A1 Jun. 11, 2015

(51) Int. Cl.
*H04R 1/02* (2006.01)
*H04R 5/02* (2006.01)
*B60R 11/02* (2006.01)
*H04B 1/00* (2006.01)

(52) U.S. Cl.
CPC .............. *B60R 11/0217* (2013.01); *H04R 5/02* (2013.01); *H04R 2499/13* (2013.01)

(58) Field of Classification Search
CPC .......... H04R 1/02; H04R 1/021; H04R 1/023; H04R 1/025; H04R 1/026; H04R 1/30; H04R 1/345; H04R 1/2811; H04R 1/2819; H04R 1/2857; H04R 5/02; H04R 5/023; H04R 2201/023; H04R 2499/13; H04R 2499/15; H04B 1/082; H04G 3/32; H04S 1/002; H04S 3/00; B60R 11/0217
USPC ........... 381/86, 302, 333, 334, 335, 336, 345, 381/349, 351, 389; 181/153, 196, 198, 199
See application file for complete search history.

(56) References Cited

U.S. PATENT DOCUMENTS

| 5,475,764 | A | 12/1995 | Polk |
| 5,825,900 | A | 10/1998 | Jeon |
| 6,031,924 | A | 2/2000 | Etzel |
| 6,076,631 | A | 6/2000 | Hoenninger et al. |
| 7,162,049 | B2 | 1/2007 | Polk, Jr. |
| 7,252,175 | B2 * | 8/2007 | Suzuki .......................... 181/198 |
| 7,526,098 | B2 | 4/2009 | Rosental et al. |

(Continued)

FOREIGN PATENT DOCUMENTS

| CN | 202138311 U | 2/2012 |
| DE | 19924921 A1 | 12/2000 |

(Continued)

OTHER PUBLICATIONS

Colin Weltin-Wu, New York Speakers Part 2: Subwoofer Design, Jul. 10, 2007.

*Primary Examiner* — Brian Ensey
(74) *Attorney, Agent, or Firm* — Global IP Counselors, LLP

(57) ABSTRACT

An audio driver cabinet is configured for movement between a first orientation within a storage structure and a second orientation outside the storage structure. The audio driver cabinet includes a side wall structure, a first wall, a second wall and a sound driver. The first wall closes off the first end of the side wall structure. The second wall is attached to an interior surface of the side wall structure between a first end and a second end of the side wall structure. A first audio chamber is defined between the first and second walls within the side wall structure. A second audio chamber is defined between the second wall and an open end of the side wall structure. The sound driver is fixed to the second wall facing the second audio chamber. The second end of the side wall structure be an open end or can be sealed.

20 Claims, 11 Drawing Sheets

(56) References Cited

U.S. PATENT DOCUMENTS

| | | |
|---|---|---|
| 7,628,249 B2 | 12/2009 | Hanna |
| 7,940,939 B1 | 5/2011 | Hamilton et al. |
| 7,983,436 B2 * | 7/2011 | Nichols et al. ............... 381/335 |
| 8,044,413 B2 | 10/2011 | Albus et al. |
| 8,130,976 B2 | 3/2012 | Linhard et al. |
| 8,469,447 B2 | 6/2013 | Baker |
| 9,014,408 B2 * | 4/2015 | Thome et al. ............... 381/335 |
| 2011/0216933 A1 * | 9/2011 | Lan ............................... 381/386 |
| 2011/0280432 A1 | 11/2011 | Tracy |

FOREIGN PATENT DOCUMENTS

| | | |
|---|---|---|
| KR | 20020012931 A | 2/2002 |
| WO | 2004056612 A1 | 7/2004 |

* cited by examiner

AUDIO SPEAKER CABINET

BACKGROUND

1. Field of the Invention

The present invention generally relates to an audio speaker cabinet within a vehicle. More specifically, the present invention relates to an audio speaker cabinet that can operate as a subwoofer with a narrow frequency band pass or can operate as a loudspeaker that outputs a wide frequency audio range.

2. Background Information

Audio systems in vehicles usually include a plurality of speakers installed at various locations within a passenger compartment of a vehicle. The plurality of speakers often includes at least a subwoofer speaker cabinet.

SUMMARY

One object of the disclosure is to provide a speaker cabinet with an open end such that when the open end of the speaker cabinet is installed to a surface of a vehicle, the surface of the vehicle serves as a sealing wall covering the open end of the speaker cabinet, thereby creating at least a partially enclosed space within the speaker cabinet.

Another object of the disclosure is to provide a speaker cabinet with two differing audio output modes, a loudspeaker mode where the speaker cabinet provides a wide frequency audio output (without the sealing wall) and a band pass enclosure mode where the speaker cabinet provides a narrow frequency audio output (with the sealing wall).

In view of the state of the known technology, one aspect of the disclosure has a vehicle audio assembly that includes a storage structure and an audio driver cabinet. The storage structure has an interior surface that defines a cabinet receiving space and a sealing wall. The audio driver cabinet is configured for movement between a first orientation within the storage structure and a second orientation outside the storage structure. The audio driver cabinet includes a side wall structure, a first wall, a second wall and a sound driver. The side wall structure has a side interior surface, a first end and a second end. The first wall is fixed to the first end of the side wall structure and has an interior surface and an exterior surface. The second wall has a first surface and a second surface with a speaker opening extending from the first surface to the second surface. The second wall is fixedly attached to the side interior surface of the side wall structure spaced apart from and located between the first end and the second end of the side wall structure. A first portion of the side wall structure, the interior surface of the first wall and the first surface of the second wall define a first audio chamber. A second portion of the side wall structure and the second surface of the second wall at least partially define a second audio chamber that is open at the second end of the side wall structure. The sound driver is fixed to the second wall covering the speaker opening. With the audio driver cabinet in the first orientation within the storage structure, the second end of the side wall structure contacts the sealing wall of the storage structure at least partially sealing the second audio chamber. Further, with the audio driver cabinet in the second orientation outside the storage structure, the second audio chamber defines a loudspeaker opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
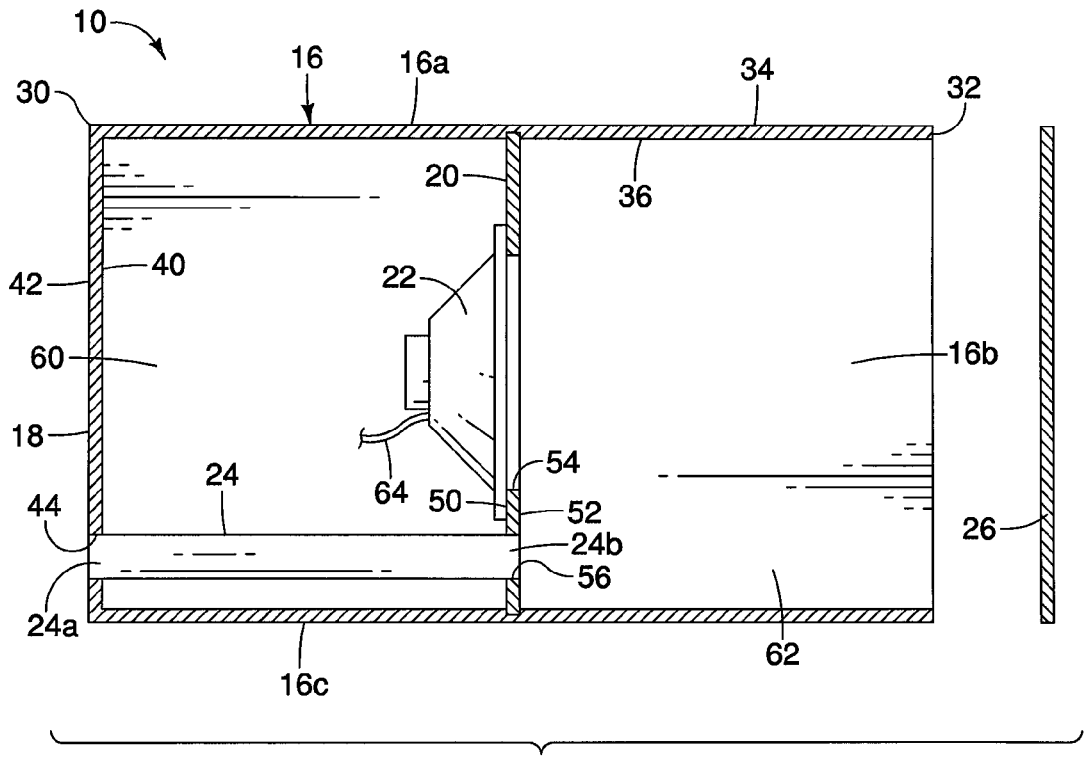
FIG. 1 is a cross-sectional schematic view of an audio speaker cabinet showing a side wall structure, a first wall, a second wall, a port structure extending from the first wall to the second wall and a removable sealing wall (detached) with a sealed audio chamber and a non-sealed audio chamber defined within the side wall structure and the port structure extending through the sealed audio chamber in accordance with a first embodiment.
Figure 2:
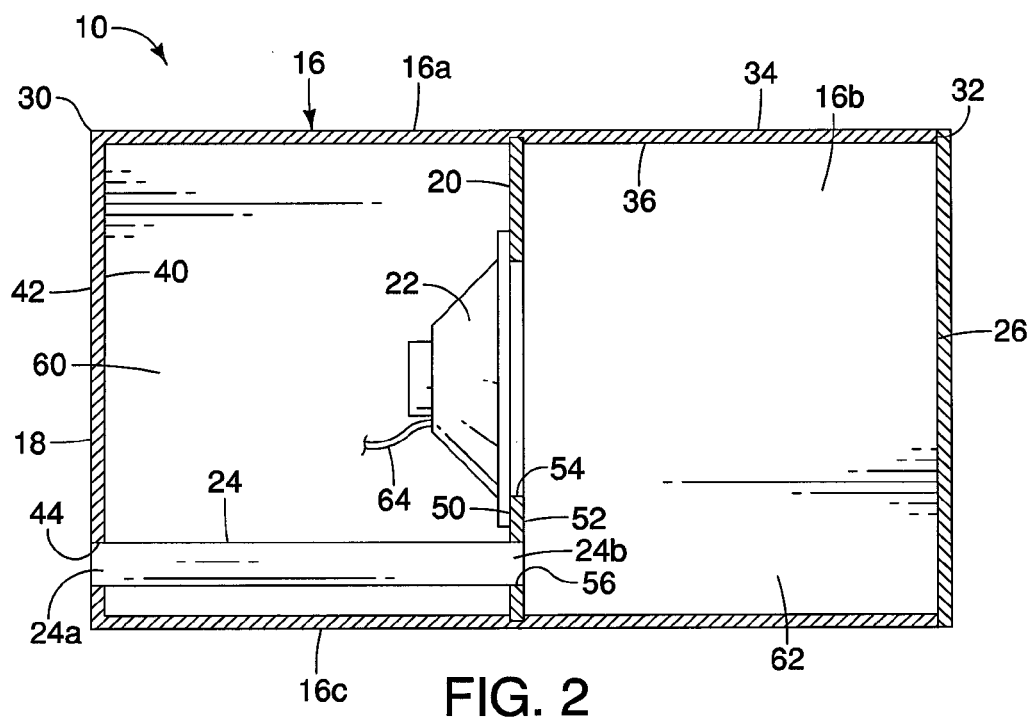
FIG. 2 is another cross-sectional schematic view of the audio speaker cabinet similar to FIG. 1 showing the removable sealing wall attached to the side wall structure in accordance with a first embodiment.

Referring initially to FIGS. 1 and 2, an audio speaker cabinet 10 is schematically illustrated in accordance with a first embodiment. The audio speaker cabinet 10 is part of an audio system that includes an audio signal generator (not shown) such as a CD player, an MP3 player, a radio system (or similar audio outputting device), an audio amplifier (not shown) and a set of audio speakers (not shown). Since audio system components, such as the above mentioned audio signal generator, audio amplifier and audio speakers in general are conventional components, further description is omitted for the sake of brevity.

The audio speaker cabinet 10 described herein below is, for example, a sub-woofer component that is specifically designed for producing low frequency audio as part of an overall audio system. In other words, the audio speaker cabinet 10 is configured and designed to serve as a subwoofer, which provides an audio output that is in a low frequency range, or narrow band width (a narrow band pass enclosure). The audio speaker cabinet 10 is also sometimes referred to as a bass cabinet providing low end or bass tones of sound produced by an audio system. However, it should be understood from the drawings and the description herein that the audio speaker cabinet 10 can be dimensioned and/or shaped to output any specific portion of the audio frequency spectrum outputted by an audio system. For example, the audio speaker cabinet 10 can be tuned to output only high end frequency range (treble), mid frequency range (middle), low-end frequency (bass) or can be shaped and/or dimensioned to output a wider range of audio frequencies.

However, in the depicted embodiments, the audio speaker cabinet 10 is designed to serve as a sub-woofer, outputting primarily a low frequency range of audible sounds in an installed orientation that is described in greater detail below, but with the removal of a sealing wall (described below) can also be used as a loudspeaker cabinet outputting a wider frequency range.

The audio speaker cabinet 10 includes a side wall structure 16, a first wall 18, a second wall 20, a sound driver 22, a port structure 24 and a sealing wall 26 arranged such that the audio speaker cabinet 10 can be removably connected to the sealing wall 26 or vice versa, as described in greater detail below.

Figure 3:
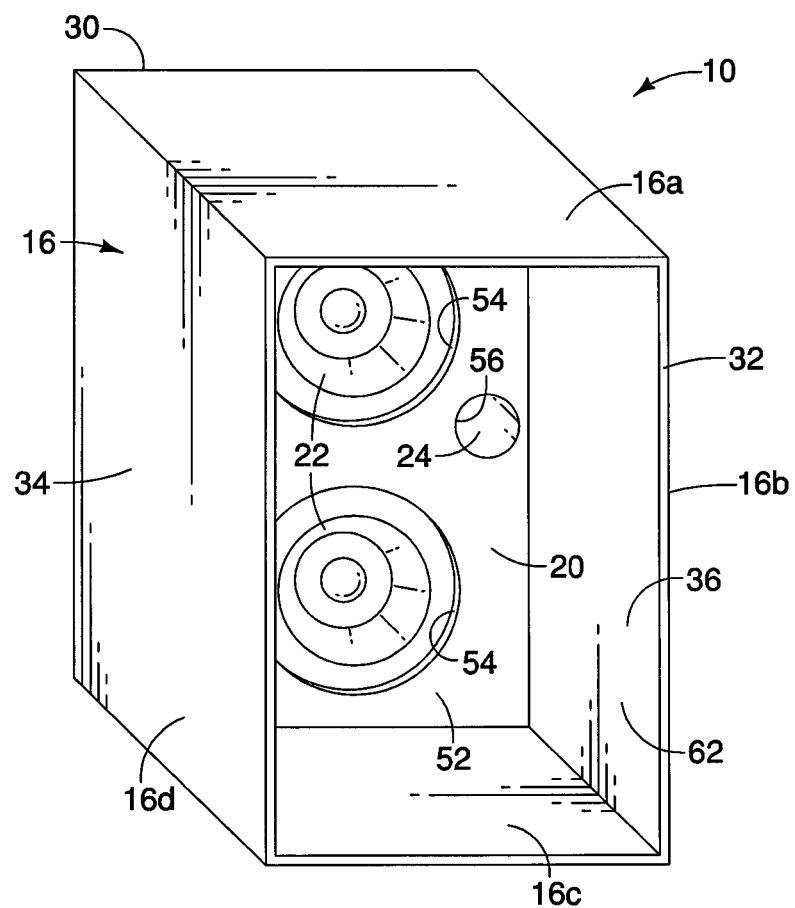
FIG. 3 is a perspective view of the audio speaker cabinet depicted in FIG. 1 with the sealing wall removed showing two sound drivers and one end of the port structure in accordance with the first embodiment.

FIGS. 1 and 2 are cross-sectional schematic views of the audio speaker cabinet 10. FIG. 3 is a perspective view of the audio speaker cabinet 10. The side wall structure 16, the first wall 18, the second wall 20, and the port structure 24 of the audio speaker cabinet 10 can be made of wood, metal, plastic, combinations thereof or any other suitable material that provides the acoustic response necessary for the sound driver 22 and the audio speaker cabinet 10 to provide a desirable audio output in a predetermined audio frequency range.

In FIG. 3, the side wall structure 16 is shown with four parts: a first side wall 16a, a second side wall 16b, a third side wall 16c and a fourth side wall 16d. As shown in FIG. 3, the first and second side walls 16a and 16b are perpendicular to one another, the second and third side walls 16b and 16c are perpendicular to one another and the third and fourth side walls 16c and 16d are perpendicular to one another thereby defining an overall rectangular shape structure. The first and second side walls 16a and 16b are rigidly attached to one another in a conventional manner, the second and third side walls 16b and 16c are rigidly attached to one another, the third and fourth side walls 16c and 16d are rigidly attached to one another and the fourth and first side walls 16d and 16a are rigidly attached to one another.

The side wall structure 16 further defines a first end 30, a second end 32, an exterior surface 34 and an interior surface 36 that extends from the first end 30 to the second end 32.

The first wall 18 has an interior surface 40, an exterior surface 42 and a first port opening 44 that extends from the interior surface 40 to the exterior surface 42. The first wall 18 is fixedly attached to the first end 30 of the side wall structure 16. The first wall 18 effectively closes off the first end 30 of the side wall structure 16.

The second wall 20 has a first surface 50, a second surface 52 opposite the first surface 50, a speaker opening 54 that extends from the first surface 50 to the second surface 52 and a second port opening 56 that extends from the first surface 50 to the second surface 52. The second wall 20 is fixedly attached to the interior surface 36 of the side wall structure 16 at a location spaced apart from the first wall 18 and spaced apart from the second end 32 of the side wall structure 16. In the embodiment depicted in FIGS. 1-3, the second wall 20 is positioned mid-way between the first end 30 and the second end 32 of the side wall structure 16. More specifically, the second wall 20 is located within the interior of the side wall structure 16. In the depicted embodiment, there are two speaker openings 54 in the second wall 20, as shown in FIG. 3. However, it should be understood from the drawings and the description herein that the audio speaker cabinet 10 can alternatively be constructed with a single speaker opening 54.

As shown in FIGS. 1 and 2, a first portion of the side wall structure 16, the interior surface 40 of the first wall 18 and the first surface 50 of the second wall 20 define a sealed audio chamber 60. A second portion of the side wall structure 16 and the second surface 52 of the second wall 20 define a non-sealed audio chamber 62.

The sound driver 22 is an electrically powered audio speaker that can be mounted to the first surface 50 or the second surface 52 of the second wall 20. In the depicted embodiment, there are two sound drivers 22. The sound drivers 22 cover the two speaker openings 54 of the second wall 20. Each of the sound drivers 22 includes speaker wires 64 that connect to the amplifier (not shown) of the audio system (not shown) such that audio signals transmitted from the amplifier to the sound driver 22 via the speaker wires 64 cause the sound driver 22 to produce audible sounds in a conventional manner. Since sound drivers and speaker wires are conventional elements, further description is omitted for the sake of brevity.

The port structure 24 has a cylindrical or tube-like shape and extends through the sealed audio chamber 60. The port structure 24 can be made of wood, metal, plastic or combinations thereof. The port structure 24 is preferably made of a thin material in order to maximize the volume of the sealed audio chamber 60.

The port structure 24 has a first end 24a that is attached to the first wall 18 at the first port opening 44 and a second end 24b attached to the second wall 20 at the second port opening 56. The first end 24a is fixed to the first wall 18 at the first port opening 44 such that an air tight seal is established between the interior of the port structure 24 and the sealed audio chamber 60 at the first wall 18. The second end 24b is fixed to the second wall 20 at the second port opening 56 such that an air tight seal is established between the interior of the port structure 24 and the sealed audio chamber 60 at the first wall 18. Further, the port structure 24 is completely hollow and has open ends such that there is fluid communication from the exterior surface 42 of the first wall 18 to the second surface 52 of the second wall 20. More specifically, audible sounds generated by the sound driver 22 within the non-sealed audio chamber 62 are ported through the port structure 24 to the exterior surface 42 of the first wall 18. However, since the sound driver 22 covers the speaker opening 54 and the port structure 24 is sealed relative to the sealed audio chamber 60, the sound generated within the non-sealed audio chamber 62 is isolated from the sealed audio chamber 60.

In other words, the port structure 24 extends through the sealed audio chamber 60 from the first port opening 44 in the first wall 18 to the second port opening 56 in the second wall 20, with the interior of the port structure 24 being completely sealed relative to the sealed audio chamber 60. The interior of the port structure 24 is completely open to the exterior surface 42 of the first wall 18 at the first port opening 44, and is therefore open to the areas outside of the audio speaker cabinet 10. The interior of the port structure 24 is further completely open to the non-sealed audio chamber 62 at the second port opening 56 of the second wall 20.

The sealing wall 26 is removably connected to the audio speaker cabinet 10. The sealing wall 26 can be a removable member, or can be a surface of another, separate structure where the audio speaker cabinet 10 attaches to the sealing wall 26 and detaches from the sealing wall 26. More specifically, the side wall structure 16 can be installed to unrelated structures having a flat surface that can serve as the sealing wall 26. The above mentioned installed orientation corresponds to the side wall structure 16 being fixed to the sealing wall 26.

A series of hand manipulated fasteners (not shown) can be used to attach and detach the sealing wall 26 from the audio speaker cabinet 10. Alternatively, a plurality of latches or clasp mechanisms can be used to attach and detach the audio speaker cabinet 10 from the sealing wall 26. Since fasteners, latches and clasp mechanisms are conventional features, further description is omitted with respect to the first embodiment for the sake of brevity.

In FIG. 2, the sealing wall 26 is attached to the audio speaker cabinet 10, at least partially sealing the non-sealed audio chamber 62. A gasket or sealing member (not shown) provides an air-tight seal between the second end 32 of the side wall structure 16 and the sealing wall 26. Thus, the non-sealed audio chamber 62 can be a completely sealed chamber with the sealing wall 26 attached, except for the port structure 24, which is open to the areas outside the audio speaker cabinet 10 and open to the non-sealed audio chamber 62. Since the port structure 24 is present within overall structure of the audio speaker cabinet 10, the non-sealed audio chamber 62 enables the audio speaker cabinet 10 to serve as a band pass enclosure with the sealing wall 26 attached to the second end 32 of the side wall structure 16.

Hence, the audio speaker cabinet 10 can provide two different audio output responses, depending upon whether or not the sealing wall 26 is attached to or detached from the audio speaker cabinet 10. Specifically, with the second end 32 of the side wall structure 16 left open (without the sealing wall 26), the audio speaker cabinet 10 operates as a loudspeaker that emits sound over a wide range of audio frequencies. Hereinafter, this is referred to as a loudspeaker mode (an uninstalled orientation). With the sealing wall 26 installed to the second end 32 of the side wall structure 16 sealing the second end 32, the audio speaker cabinet 10 has a completely different audio response/output and operates in a band pass enclosure mode (the installed orientation), but may also be referred to as a sealed enclosure mode. Specifically, with the sealed wall 26 installed sealing the second end 32 of the side wall structure 16, the audio speaker cabinet 10 serves as a band pass enclosure outputting a limited range of frequencies much narrower than when serving in the loudspeaker mode. Since the depicted audio speaker cabinet 10 is configured as a subwoofer, the narrow range of frequencies is at a low end of the audio spectrum. Further, with the sealed wall 26 installed, the non-sealed audio chamber 62 is a ported audio chamber, since the port structure 24 is open to both the non-sealed audio chamber 62 and areas outside the audio speaker cabinet 10.

Figure 4:
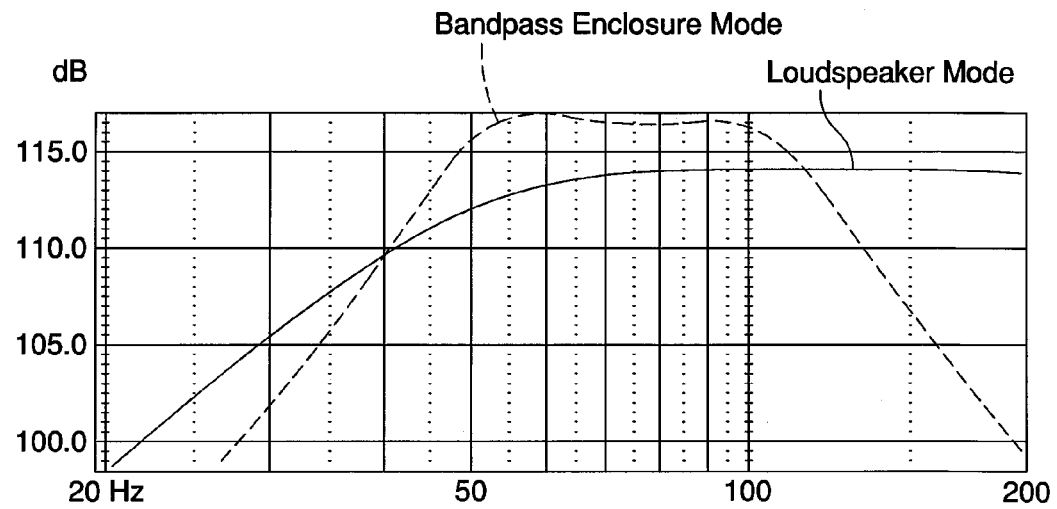
FIG. 4 is a graph showing one example of the audio frequency output from the audio speaker cabinet depicted in FIG. 1-3, showing the audio frequency response with the sealing wall attached (a band pass enclosure response) and with the sealing wall removed (a loud speaker response) in accordance with the first embodiment.

FIG. 4 is a representation of one example of an audio output of the audio speaker cabinet 10. The range of frequencies depicted in FIG. 4 demonstrates the difference in the two modes of operation of the audio speaker cabinet 10, the installed orientation (subwoofer, or band pass enclosure mode) and the uninstalled orientation (loudspeaker mode). When serving in loudspeaker mode (without the sealing wall 26), the audio speaker cabinet 10 outputs a frequency range that begins slightly above 20 Hz and also outputs frequencies up to at least up to 200 Hz and beyond, as indicated by the solid line in the graph depicted in FIG. 4. It should be noted that the maximum output is approximately 114.0 dB, with a maximum output being above 50 Hz. It should be understood from the drawings and the description herein, that the depiction in FIG. 4 is not the only possible audio response from the audio speaker cabinet 10. Specifically, the audio speaker cabinet 10 can be re-configured and re-dimensioned to output different ranges of audio frequencies.

However, with the audio speaker cabinet 10 serving in the band pass enclosure mode (with the sealing wall 26 installed to and sealing the second end 32 of the side wall structure 16), the range of frequencies outputted is much narrower than when serving in the loudspeaker mode. Specifically, with the audio speaker cabinet 10 is serving in a band pass enclosure mode, the range of frequencies outputted is maximized between 50 Hz and 100 Hz, with a rapidly diminishing output above 100 Hz and approaching zero at approximately 200 Hz, as shown in dashed lines in FIG. 4. The dashed line represents a tuned audio frequency range that is desired as the output in the band pass enclosure mode. Between 50 Hz and 100 Hz, the maximum output is approximately 117.0 dB for the band pass enclosure. The decibel (dB) is a measurement of sound level that uses a logarithmic scale that increases exponentially as the numeric value increases. Therefore, the difference between 114.0 dB (loudspeaker mode) and 117.0 dB (sub-woofer or band pass enclosure mode) is significant. The depicted embodiment is such that the difference in outputted audio levels as depicted in FIG. 4 is more than doubled between the loudspeaker mode (no sealing wall 26 present) and the band pass enclosure mode (sealing wall 26 installed to second end 32 of the side wall structure 16).

The output curves in FIG. 4 are only one example of the differing outputs from the audio speaker cabinet 10. The exact range of frequencies outputted by the audio speaker cabinet 10 can be tuned (altered and modified) by changing the overall volume of the sealed audio chamber 60, the overall volume of the non-sealed audio chamber 62, the dimensions (overall length and overall diameter) of the port structure 24 and the output response characteristics of the sound driver 22. However, it should be noted that regardless of the tuned audio frequency range output from the audio speaker cabinet 10, the maximum decibel output is always significantly greater in the tuned audio frequency range when the sealing wall 26 is installed as compared to the maximum decibel output with the sealing wall 26 not installed. This increase in output within a tuned audio frequency range is realized in most portions of the audible frequency range and in particular for the depicted the audio speaker cabinet 10.

Second Embodiment

Figure 5:
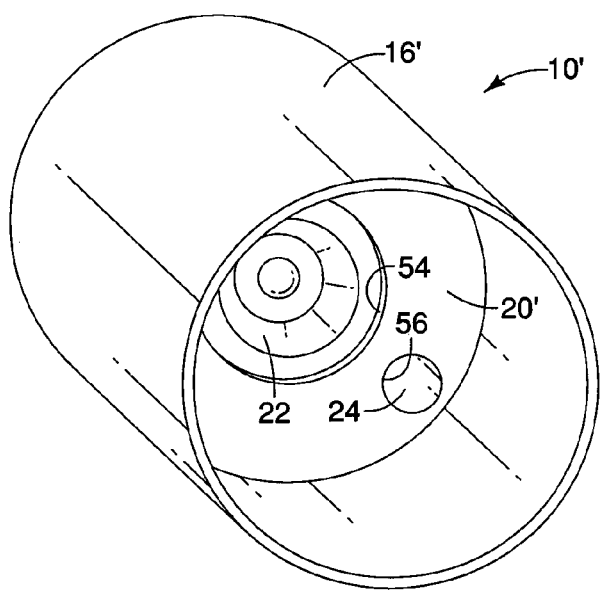
FIG. 5 is a perspective view of an audio speaker cabinet in accordance with a second embodiment.

Referring now to FIG. 5, an audio speaker cabinet 10' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The audio speaker cabinet 10' basically includes all of the features of the audio speaker cabinet 10 of the first embodiment, except that the audio speaker cabinet 10' has a cylindrical shape instead of a rectangular shape. Specifically, the audio speaker cabinet 10' includes a side wall structure 16' that has a cylindrical shape, as shown in FIG. 3. Further a second wall 20' is circular in shape and has only a single speaker opening 54. A first wall (not visible in FIG. 3) attached to the audio speaker cabinet 10' also has a circular shape, and together with the second wall 20' and a first portion of the side wall structure 16' defines a sealed audio chamber (not visible). A single sound driver 22 is attached to the second wall 20'. Further the audio speaker cabinet 10' further includes the port structure 24 that extends from the second wall 20' to the first wall (not shown).

Although not shown, the audio speaker cabinet 10' further includes the removable sealing wall 26 of the first embodiment, The audio frequency output of the audio speaker cabinet 10' is similar or the same as the output of the audio speaker cabinet 10 of the first embodiment in that in loudspeaker mode (without a sealing wall 26) the decibel output is less than when operating in the band pass enclosure mode (with the sealing wall 26 attached to the side wall structure 16'). Further, in the band pass enclosure mode, the audio frequency range is reduced and the overall decibel output is at least doubled, as depicted in FIG. 4.

In FIG. 5, the side wall structure 16' has an overall cylindrical shape with a uniform outer diameter. However, it should be understood from the drawings and the description herein that the side wall structure 16' can be provided with a first portion (not shown) that has a first diameter and a second portion that has a second diameter different than the first diameter.

Third Embodiment

Referring now to FIG. 6-20, an audio speaker cabinet 110 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The audio speaker cabinet 110 basically has all the features of the audio speaker cabinet 10 of the first embodiment, but is shaped for use at a plurality of differing, but specific, locations on or within a vehicle 112. As with the first embodiment, the audio speaker cabinet 110 is designed to serve as a subwoofer of a vehicle audio system within the vehicle 112, outputting primarily a tuned frequency range of audible sounds at the lower end of the audio spectrum, but can also be removed from or moved about the vehicle 112 and used in loudspeaker mode. The audio speaker cabinet 110, as shown in the drawings, is specifically designed to fit within a confined space within the vehicle 112 when operating in the band pass enclosure mode. A description of the vehicle 112 is provided below after a brief description of the audio speaker cabinet 110.

The audio speaker cabinet 110 includes a side wall structure 116, a first wall 118, a second wall 120, a sound driver 22 and a port structure 124. Various surfaces of the vehicle 112 can serve as a sealing wall, as is described in greater detail below with the description of the vehicle 112.

Figure 6:
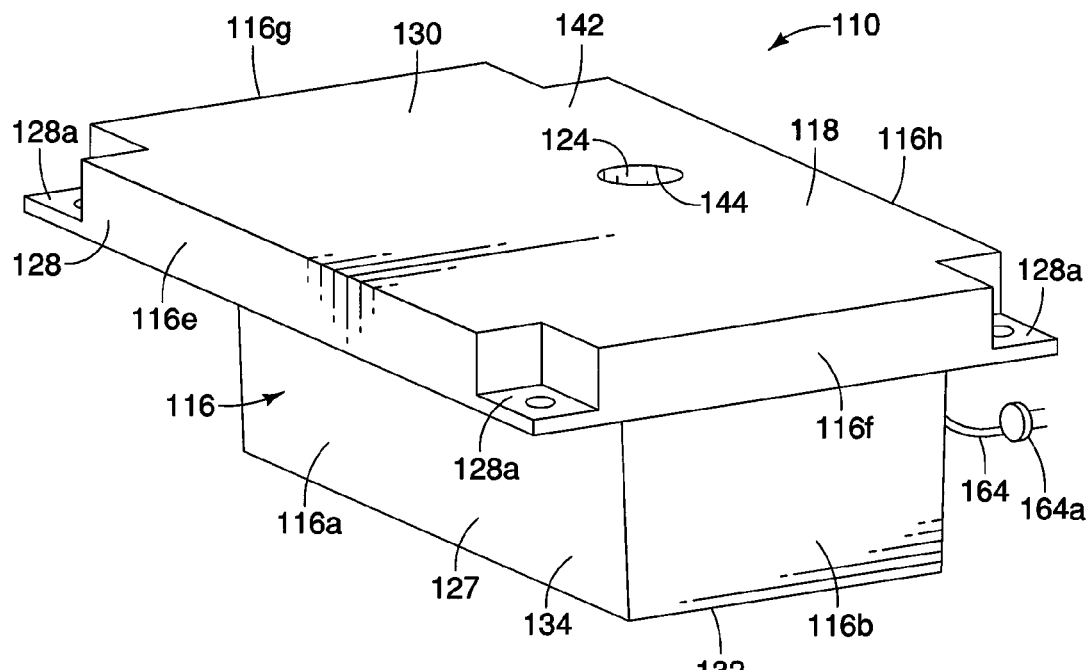
FIG. 6 is a perspective view of an audio speaker cabinet in accordance with a third embodiment.
Figure 7:
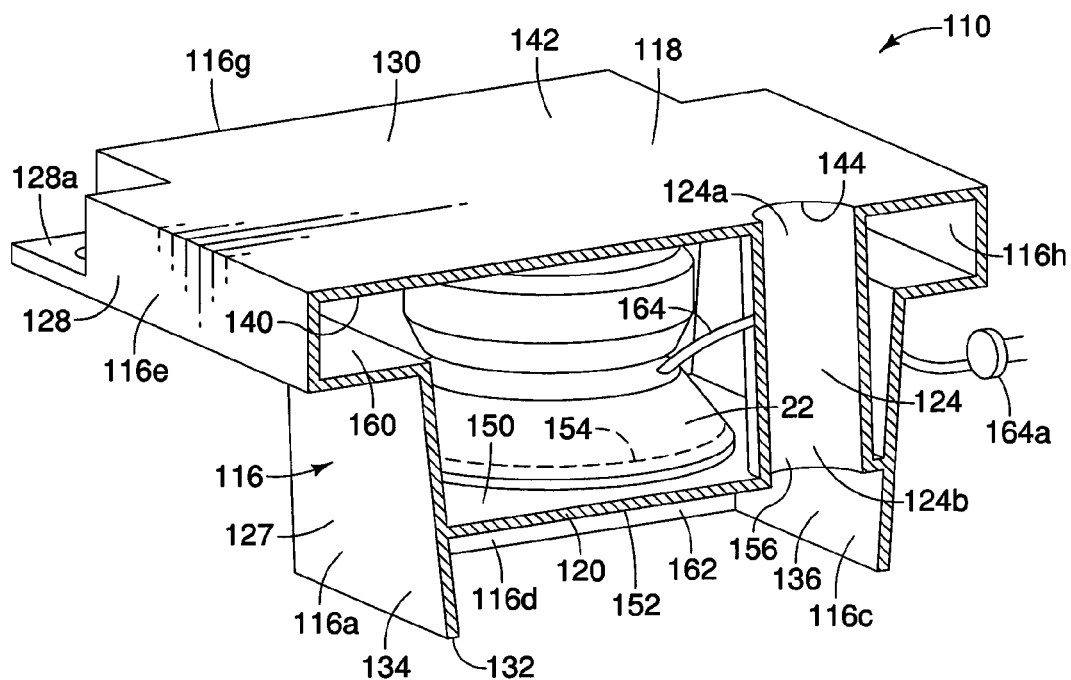
FIG. 7 is a cross-sectional perspective view of the audio speaker cabinet showing a side wall structure, a first wall, a second wall and a port structure extending from the first wall to the second wall with a sealed audio chamber and a non-sealed audio chamber defined within the side wall structure and the port structure extending through the sealed audio chamber in accordance with the third embodiment.

FIG. 6 is a perspective view of the audio speaker cabinet 110. FIG. 7 is a cross-sectional schematic view of the audio speaker cabinet 110 showing an interior of the audio speaker cabinet 110. The side wall structure 116, the first wall 118, the second wall 120, and the port structure 124 of the audio speaker cabinet 110 can be made of wood, metal, plastic, combinations thereof or any other suitable material that provides the acoustic response necessary for the sound driver 22 and the audio speaker cabinet 110 to provide a desirable audio output (loudspeaker mode) or tuned audio output (band pass enclosure mode) in a predetermined narrow frequency range, depending upon the mode of use.

As shown in FIG. 6, the side wall structure 116 of the audio speaker cabinet 110 includes a lower section 127 and an upper section 128. The upper section 128 includes a plurality of attachment flanges 128a that are described in greater detail below. The upper section 128 has greater width and length dimensions (measured in horizontal directions) relative to the lower section 127, but the lower section 127 has an overall height dimension (measured vertically) that is greater than the overall height of the upper section 128.

The side wall structure 116 further includes a first side wall 116a, a second side wall 116b, a third side wall 116c and a fourth side wall 116d that define the lower section 127. As shown in FIG. 7, the first side wall 116a and the third side wall 116c are not parallel to one another, but are each inclined relative to a vertical direction, as is explained below. The second side wall 116b and fourth side wall 116d can be parallel to one another, but can alternatively be slightly inclined relative to a vertical direction, as is explained below.

The first and second side walls 116a and 116b are rigidly attached to one another in a conventional manner, the second and third side walls 116b and 116c are rigidly attached to one another, the third and fourth side walls 116c and 116d are rigidly attached to one another and the fourth and first side walls 116d and 116a are rigidly attached to one another. The first side wall 116a, the second side wall 116b, the third side wall 116c and the fourth side wall 116d define a shape that is approximately a rectangularly shaped box with an open lower end, but has tapering sides that converge toward one another in a downward direction (relative to FIGS. 6 and 7) due to the non-parallel relationship between at least the first and third side walls 116a and 116c.

The upper section 128 of the side wall structure 116 is defined by side wall sections 116e, 116f, 116g and 116h, as shown in FIG. 6. The side wall structure 116 further defines a first end 130 (an upper end in FIGS. 6 and 7), a second end 132 (a lower end in FIGS. 6 and 7), an exterior surface 134 and an interior surface 136. The second end 132 is open, as shown in FIG. 7.

The first wall 118 has an interior surface 140, an exterior surface 142 and a first port opening 144 that extends from the interior surface 140 to the exterior surface 142. The first wall 118 is fixedly attached to the first end 130 of the side wall structure 116. The first wall 118 effectively closes off the first end 130 of the side wall structure 116.

The second wall 120 has a first surface 150, a second surface 152 opposite the first surface 150, a speaker opening 154 that extends from the first surface 150 to the second surface 152 and a second port opening 156 that extends from the first surface 150 to the second surface 152. The second wall 120 is fixedly attached to the interior surface 136 of the side wall structure 116 at a location spaced apart from the first wall 118 and spaced apart from the second end 132 of the side wall structure 116. The second wall 120 is positioned between the first end 130 and the second end 132 of the side wall structure 116. Further, the second wall 120 is located within the interior of the side wall structure 116. In the third embodiment, there are two speaker openings 154, although only one speaker opening 154 is shown. Further, there are two sound drivers 22, although only one is shown in FIG. 7.

As shown in FIGS. 6 and 7, the side wall sections 116e, 116f, 116g and 116h, along with an upper portion of each of the first side wall 116a, the second side wall 116b, the third side wall 116c and the fourth side wall 116d, the interior surface 140 of the first wall 118 and the first surface 150 of the second wall 120 define a sealed audio chamber 160 (a first audio chamber). A lower portion of each of the first side wall 116a, the second side wall 116b, the third side wall 116c and the fourth side wall 116d, along with the second surface 152 of the second wall 120 define a non-sealed audio chamber 162 (a second audio chamber).

In other words, the sealed audio chamber 160 is defined by the upper section 128 of the side wall structure 116 and an upper area of the lower section 127 of the side wall structure 116 (above the second wall 120). The non-sealed audio chamber 160 (a ported chamber) is defined by a lower area of the lower section 127 of the side wall structure 116 (below the second wall 120).

The upper section 128 is dimensioned to provide the hollow interior of the sealed audio chamber 160 with a large overall volume necessary to provide the audio speaker cabinet 110 with appropriate acoustic characteristics necessary to achieve a tuned audio frequency range that is desired as the output of a band pass enclosure (in the band pass enclosure mode).

As with the first embodiment, the sound driver 22 is an electrically powered audio speaker that can be mounted to the first surface 150 or the second surface 152 of the second wall 120. In the depicted embodiment, there are two sound drivers 22. The sound drivers 22 cover the two speaker openings 154 of the second wall 120. Each of the sound drivers 22 includes speaker wires 164 that connect to the amplifier (not shown) of the audio system (not shown) such that audio signals transmitted from the amplifier to the sound driver 22 via the speaker wires 164 cause the sound driver 22 to produce audible sounds in a conventional manner. Since sound drivers and speaker wires are conventional elements, further description is omitted for the sake of brevity. In the depicted embodiment, there are two sound drivers 22 however, only one is shown in FIG. 7.

The port structure 124 has a cylindrical or tube-like shape and extends through the sealed audio chamber 60. The port structure 124 can be made of wood, metal, plastic or combinations thereof. The port structure 124 is preferably made of a thin material in order to maximize the volume of the sealed audio chamber 60.

The port structure 124 has a first end 124a that is installed to the first wall 118 at the first port opening 144 and a second end 124b installed to the second wall 120 at the second port opening 156. The first end 124a is fixed to the first wall 118 at the first port opening 144 such that an air tight seal is established between the interior of the port structure 124 and the sealed audio chamber 160 at the first wall 118. The second end 124b is fixed to the second wall 120 at the second port opening 156 such that an air tight seal is established between the interior of the port structure 124 and the sealed audio chamber 160 at the first wall 118. Further, the port structure 124 is completely hollow and has open ends such that there is fluid communication from the exterior surface 142 of the first wall 118 to the second surface 152 of the second wall 120. More specifically, audible sounds generated by the sound driver 22 within the non-sealed audio chamber 162 are ported through the port structure 124 to the exterior surface 142 of the first wall 118.

In other words, the port structure 124 extends through the sealed audio chamber 160 from the first port opening 144 in the first wall 118 to the second port opening 156 in the second wall 120, with the interior of the port structure 124 being completely sealed relative to the sealed audio chamber 160. The interior of the port structure 124 is completely open to the exterior surface 142 of the first wall 118 at the first port opening 144, and is therefore open to the areas outside of the audio speaker cabinet 110. The interior of the port structure 124 is further completely open to the non-sealed audio chamber 162 at the second port opening 156 of the second wall 120.

A description of related portions of the vehicle 112 is now provided with specific reference to FIGS. 8-22. The vehicle 112 shown in the drawings is, for example, a pickup truck with a passenger compartment 180 and a cargo area 182. The passenger compartment 180 is what is referred to as a Crew Cabin and includes at least a front seat 184 and a rear seat 186. The front seat 184 and the rear seat 186 are attached to a floor 188 that at least partially defines the passenger compartment 180.

It should be understood from the drawings and the description herein that the vehicle 112 can alternatively be a vehicle other than a pickup truck, such as a sedan, coupe, van or sports utility vehicle (SUV). Further, regardless of the vehicle design of the vehicle 112 can include at least one seat that includes a storage box or storage compartment under the seat, as is described below.

Figure 8:
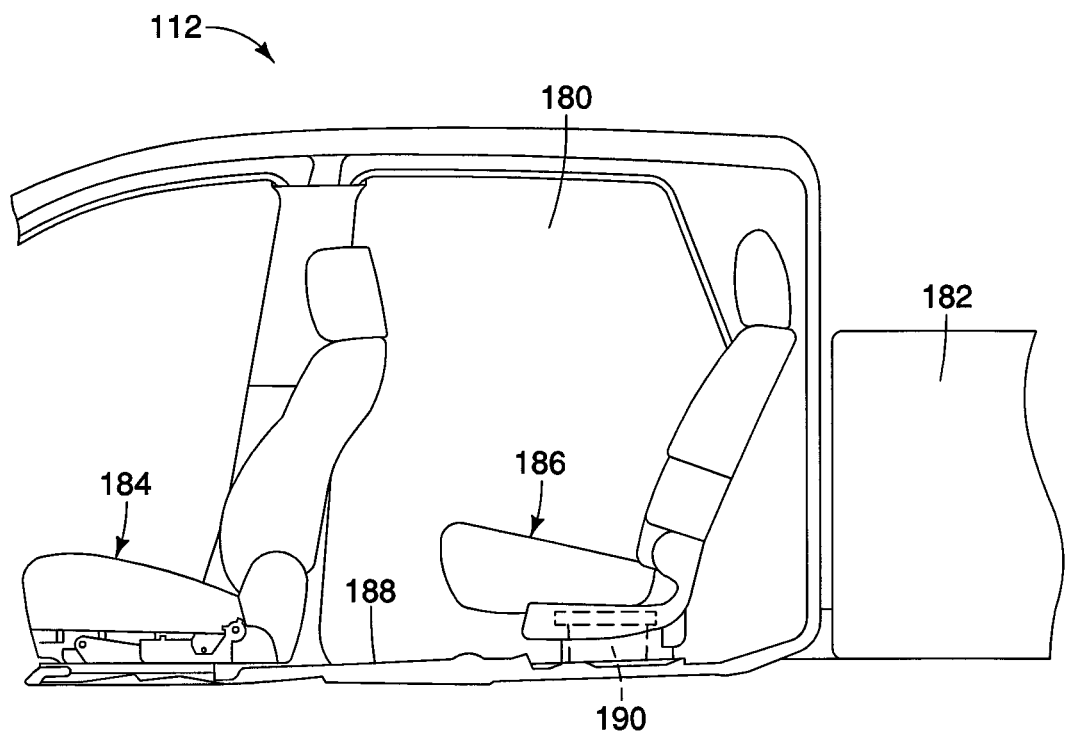
FIG. 8 is a side view of a vehicle that includes a storage compartment structure under a rear seat within a passenger compartment and a cargo area structure rearward from the passenger compartment in accordance with the third embodiment.
Figure 9:
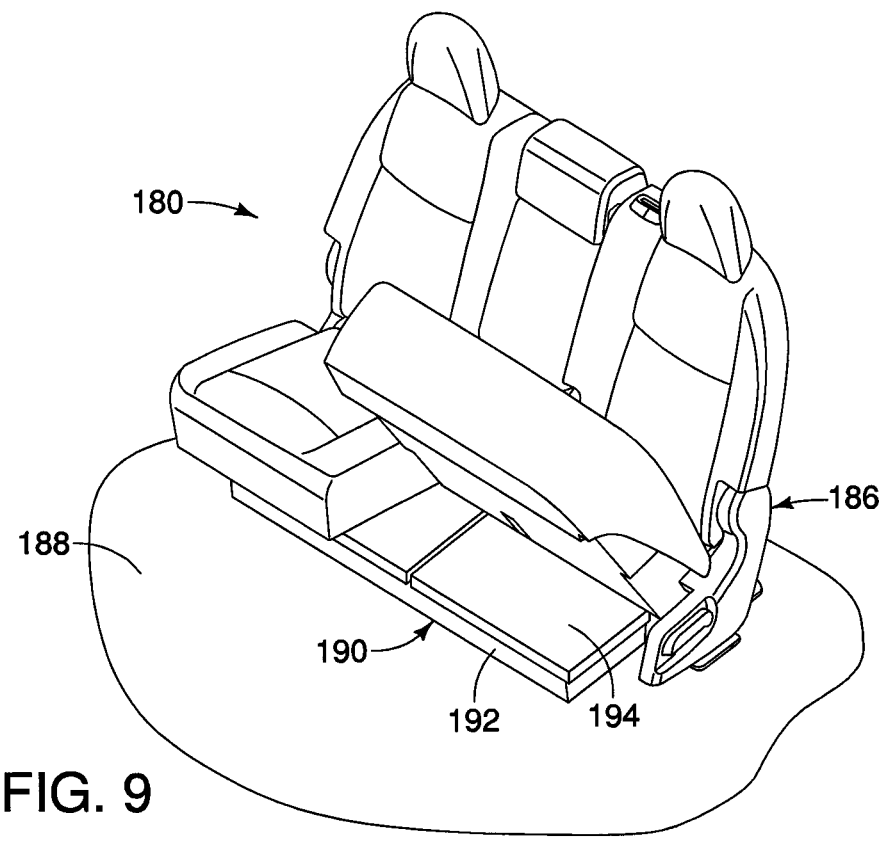
FIG. 9 is a perspective view of the rear seat of the vehicle showing the storage compartment structure under the rear seat in accordance with the third embodiment.

As shown in FIGS. 8 and 9, the rear seat 186 within the passenger compartment 180 is movable from a seating position (FIG. 8) to an upright portion (FIG. 9). In the upright position, a storage compartment structure 190 is exposed. The storage compartment structure 190 can be a structure permanently fixed to the floor 180 of the passenger compartment 180 under the rear seat 186 or can be a removable structure.

Figure 10:
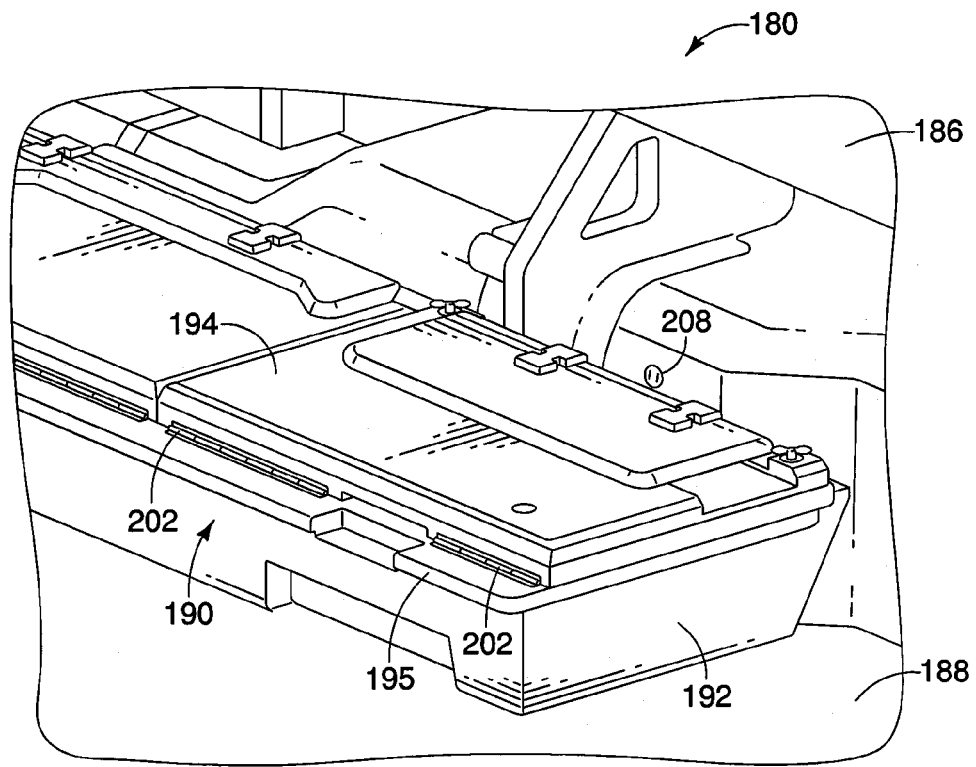
FIG. 10 is a perspective view of the storage compartment structure showing a removable hinged lid attached thereto in accordance with the third embodiment.
Figure 11:
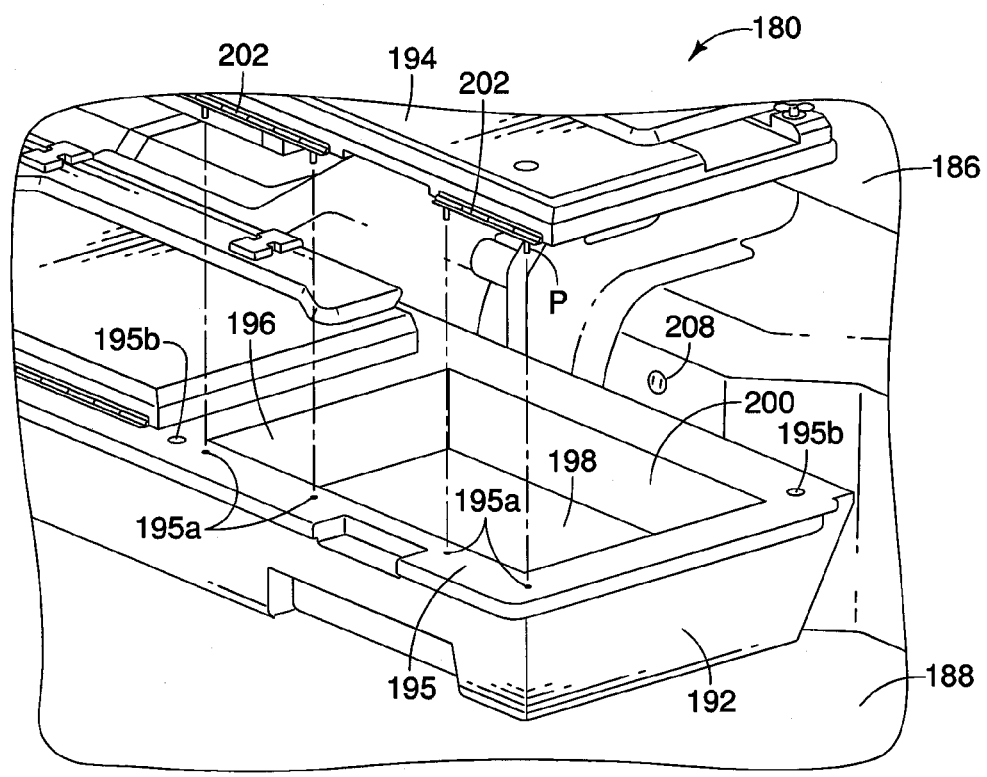
FIG. 11 is another perspective view of the storage compartment structure similar to FIG. 10, showing the removable hinged lid removed exposing a compartment within the storage compartment structure in accordance with the third embodiment.

As shown in FIGS. 10 and 11, the storage compartment structure 190 includes a box-like enclosure 192, a lid portion 194 and a flange portion 195. The box-like enclosure 192 has side walls or interior surfaces 196 and a bottom surface or sealing wall surface 198 that together define storage space that also serves as a cabinet receiving space 200.

Figure 13:
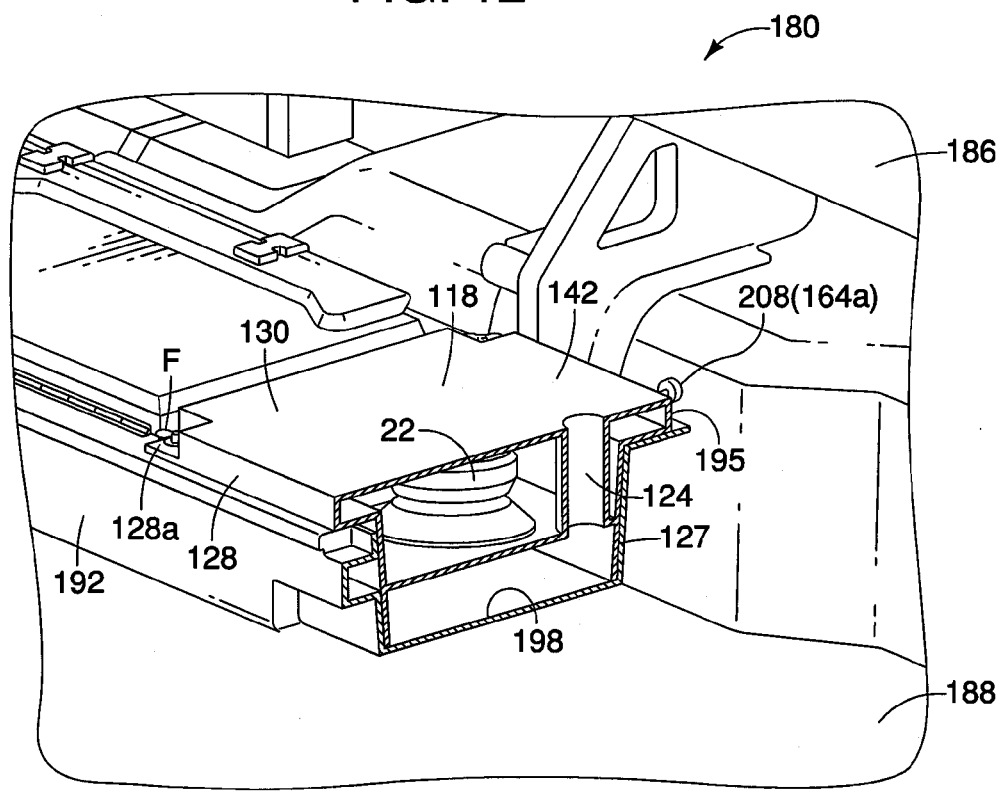
FIG. 13 is a cross-sectional perspective view of the storage compartment structure showing interior details of the audio speaker cabinet installed in the compartment of the storage compartment structure in accordance with the third embodiment.

The interior surfaces 196 define an approximate rectangular shape. However, one or more of the interior surfaces 196 can be inclined with respect to vertical and can have a shape that is complementary to the shape of the side wall structure 116. The sealing wall surface 198 of the box-like enclosure 192 of the storage compartment structure 190 is positioned adjacent to and immediately above the floor 188 of the passenger compartment 180, as shown in FIGS. 11 and 13.

Figure 12:
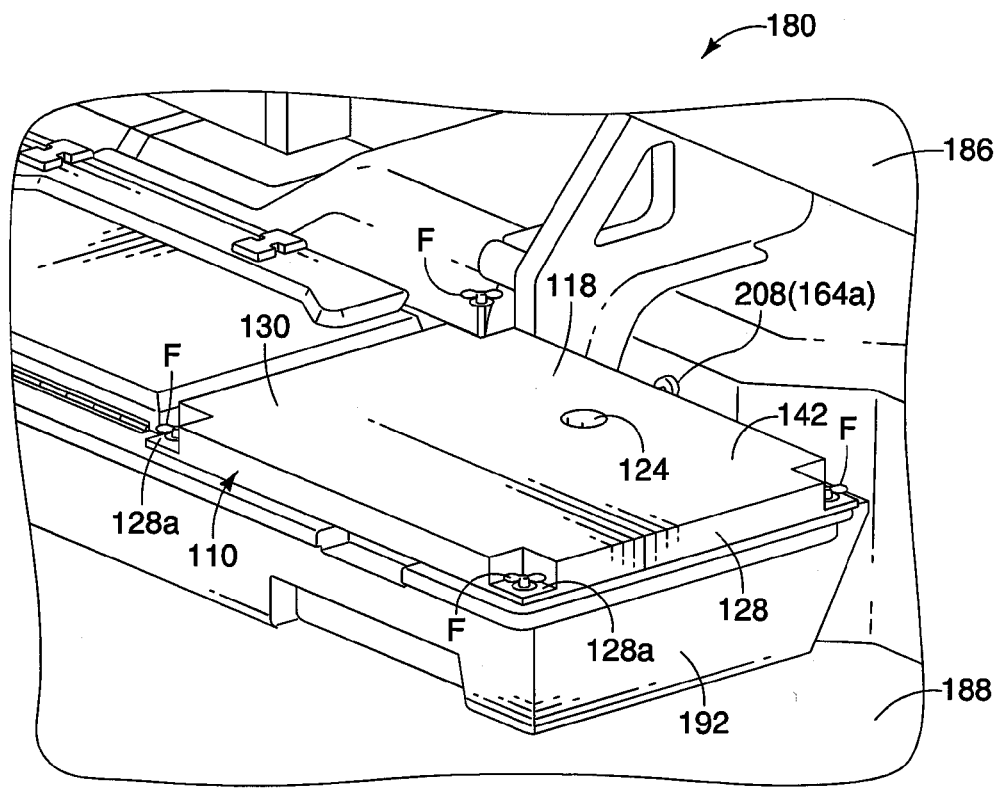
FIG. 12 is another perspective view of the storage compartment structure similar to FIG. 11 showing the audio speaker cabinet installed in the compartment of the storage compartment structure in accordance with the third embodiment.

The lid portion 194 is removably attached to the box-like enclosure 192. The lid portion 194 includes hinges 202 that have attachment pins P, as indicated in FIG. 11. When installed to the box-like enclosure 192, the lid portion 194 is movable between a closed orientation (FIGS. 9 and 10) and an open orientation (not shown) where the lid portion 194 is pivoted about the hinges 202 exposing the cabinet receiving space 200. With the lid portion 194 removed from the box-like enclosure 192, the box-like enclosure 192 can receive the audio speaker cabinet 110, as shown in FIGS. 12 and 13. Further, as shown in FIG. 8, the rear seat 186 covers the audio speaker cabinet 110 with the audio speaker cabinet 110 installed in the cabinet receiving space 200 of the box-like enclosure 192.

The flange portion 195 of the storage compartment structure 190 includes a plurality of apertures 195a that receive the attachment pins P of the lid portion 194, and a pair of apertures 195b that receive fasteners F that retain the audio speaker cabinet 110, as described below. The fasteners F basically define a clamping mechanism. However clamping mechanisms other than fasteners F can be employed to retain the audio speaker cabinet 110 in position.

As mentioned above, the audio speaker cabinet 110 can be installed and/or used to produce sound in a plurality of differing locations on or within the vehicle 112. A first orientation of the audio speaker cabinet 110 is defined with the audio speaker cabinet 110 installed within the storage compartment structure 190, as shown in FIGS. 12 and 13.

With the audio speaker cabinet 110 in the first orientation within the storage compartment structure 190, the non-sealed audio chamber 162 (the second audio chamber) is positioned above the sealing wall surface 198 and the sealed audio chamber 160 (the first audio chamber) is positioned above the non-sealed audio chamber 162. Further, the rear seat 186 is located above the sealed audio chamber 160.

One or more of the interior surfaces 196 of the box-like enclosure 192 can be inclined relative to vertical, as mentioned above. The side wall structure 116 of the audio speaker cabinet 110 is shaped and inclined such that the first, second, third and fourth side walls 116a, 116b, 116c and 116d conform to the shapes and angles of the interior surfaces 196 of the storage compartment structure 190. Further, the outer periphery of the upper section 128 and, in particular, the attachment flanges 128a of the audio speaker cabinet 110, are shaped to overlay the flange 195 of the storage compartment structure 190.

Thus, the overall shape of the audio speaker cabinet 110 is configured such that the lower section 127 fits within the storage compartment structure 190 and the upper section 128 extends along the flange 195, completely covering that portion of the storage compartment structure 190 that would otherwise be covered by the lid portion 194. Thus, the audio speaker cabinet 110 is designed such that the respective interior volumes of the sealed audio chamber 160 and the non-sealed audio chamber 162 are maximized in accordance with audio cabinet design.

As indicated in FIGS. 10 and 11, the floor 188 of the vehicle 112 includes an outlet 208 that is electrically connected to a sound system (not shown) within the vehicle 112. The outlet 208 is provided with a powered audio signal that powers and operates the sound driver 22 of the audio speaker cabinet 110. As shown in FIGS. 12 and 13, a connector 164a, electrically connected to the speaker wires 164 of the sound drivers 22 is plugged into the outlet 208, as shown in FIGS. 12 and 13.

Figure 14:
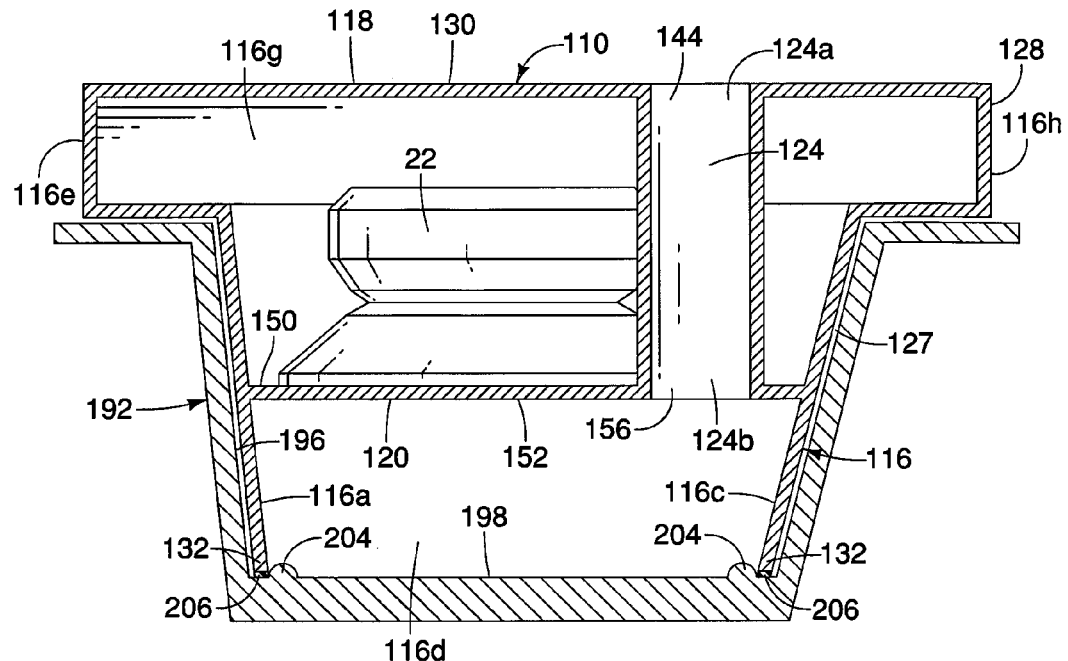
FIG. 14 is a side cross-sectional view of the storage compartment structure and the audio speaker cabinet with a surface of the storage compartment structure serving as a sealing wall in accordance with the third embodiment.

As shown in FIG. 14, the sealing wall surface 198 of the storage compartment structure 190 includes an embossed section 204. The embossed section 204 conforms to the shape of an inner edge of the second end 132 of the side wall structure 116 of the audio speaker cabinet 110. A seal 206 is inserted between the second end 132 and the sealing wall surface 198 along an outer perimeter of the embossed section 204. The seal 206 can be attached to the second end 132 or can be attached to the sealing wall surface 198. The seal 206 ensures an air tight seal between the sealing wall surface 198 and the second end 132 of the side wall structure 116 of the audio speaker cabinet 110. Thus, when the audio speaker cabinet 110 is installed to the storage compartment structure 190, the non-sealed audio chamber 162 is sealed relative to the sealing wall surface 198 of the storage compartment structure 190. Consequently, with the audio speaker cabinet 110 installed in the first orientation to the storage compartment structure 190, the audio speaker cabinet 110 operates as a band pass enclosure in the band pass enclosure mode, providing a narrow frequency audio band, as indicated in FIG. 4.

As indicated in FIG. 12, removable fasteners F retain the audio speaker cabinet 110 to the storage compartment structure 190. The fasteners F can be removed such that the audio speaker cabinet 110 can be in a different location in a different orientation on or within the vehicle 112, as discussed below.

Figure 15:
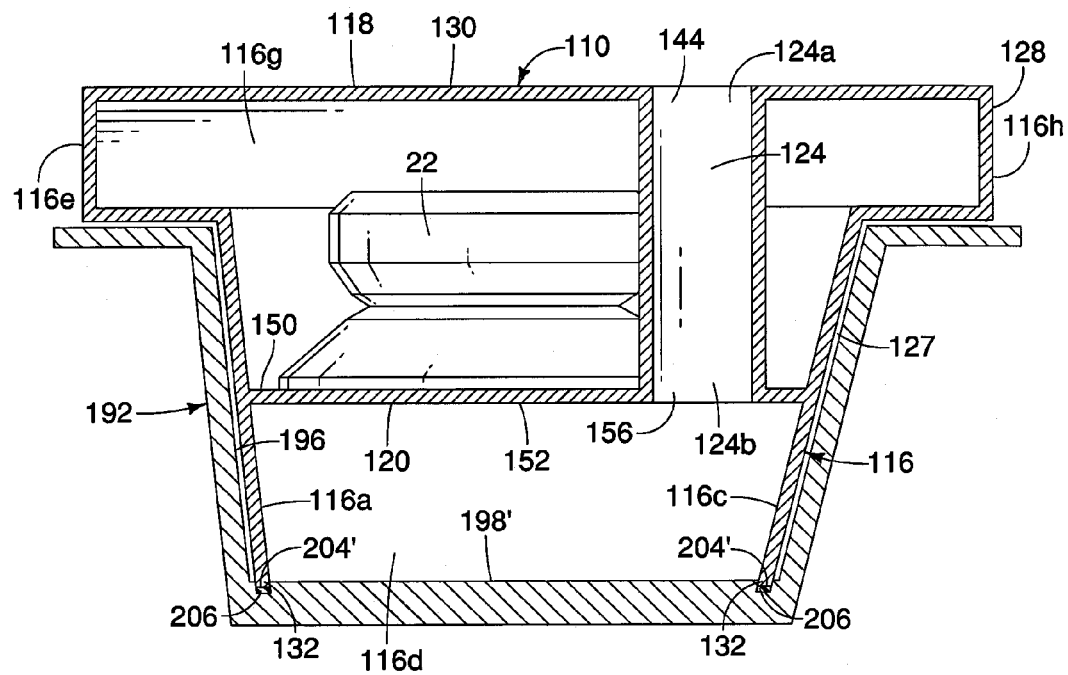
FIG. 15 is another side cross-sectional view of the storage compartment structure and the audio speaker cabinet with a surface of the storage compartment structure serving as a sealing wall in accordance with a modification to the third embodiment.

FIG. 15 shows a slight modification to the storage compartment structure 190 of the third embodiment. Specifically, the sealing wall surface 198 can be modified to yield a sealing wall surface 198' that includes a recess 204' that replaces the embossed section 204. The recess 204' is dimensioned to receive the second end 132 of the side wall structure 116 of the audio speaker cabinet 110. The seal 206 is inserted into the recess 204' with the second end 132 of the side wall structure 116 of the audio speaker cabinet 110 also installed into the recess 204'. In this modification, the audio speaker cabinet 110 installed in the first orientation to the storage compartment structure 190 such that the audio speaker cabinet 110 operates as a band pass enclosure in the band pass enclosure mode providing a narrow frequency audio band, as indicated in FIG. 4.

Figure 16:
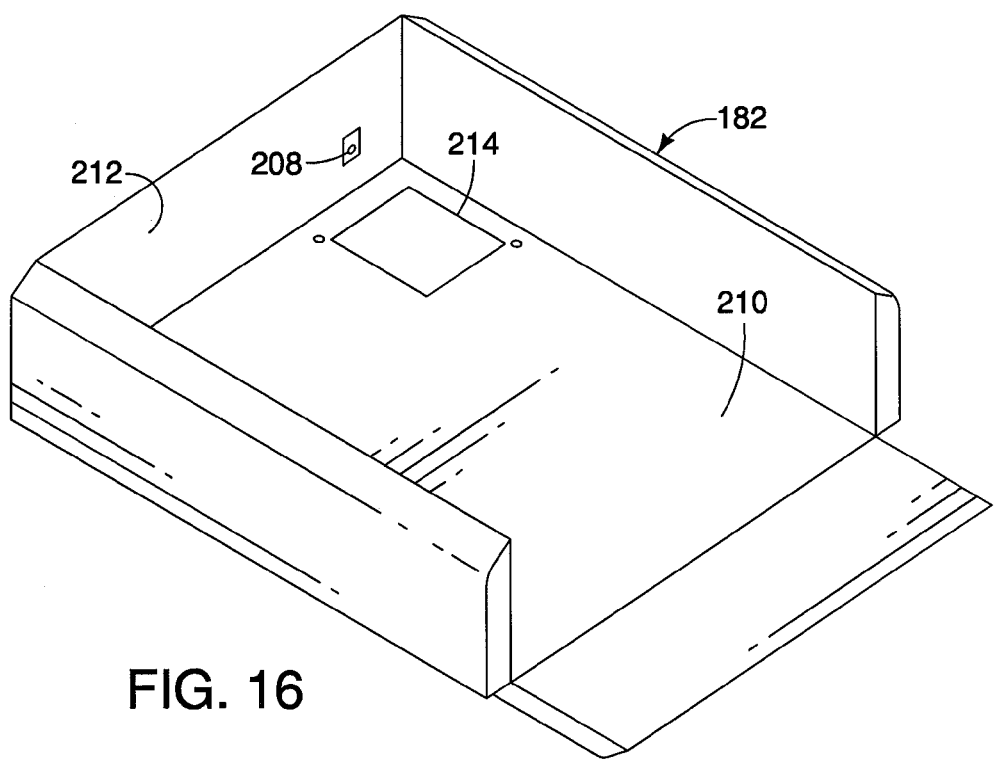
FIG. 16 is a perspective view of the cargo area structure of the vehicle depicted in FIG. 8 showing a cabinet receiving area within the cargo area structure in accordance with the third embodiment.

As shown in FIG. 16, the cargo area 182 includes a main surface 210 and an upright wall 212. The upright wall 212 includes another outlet 208.

Figure 17:
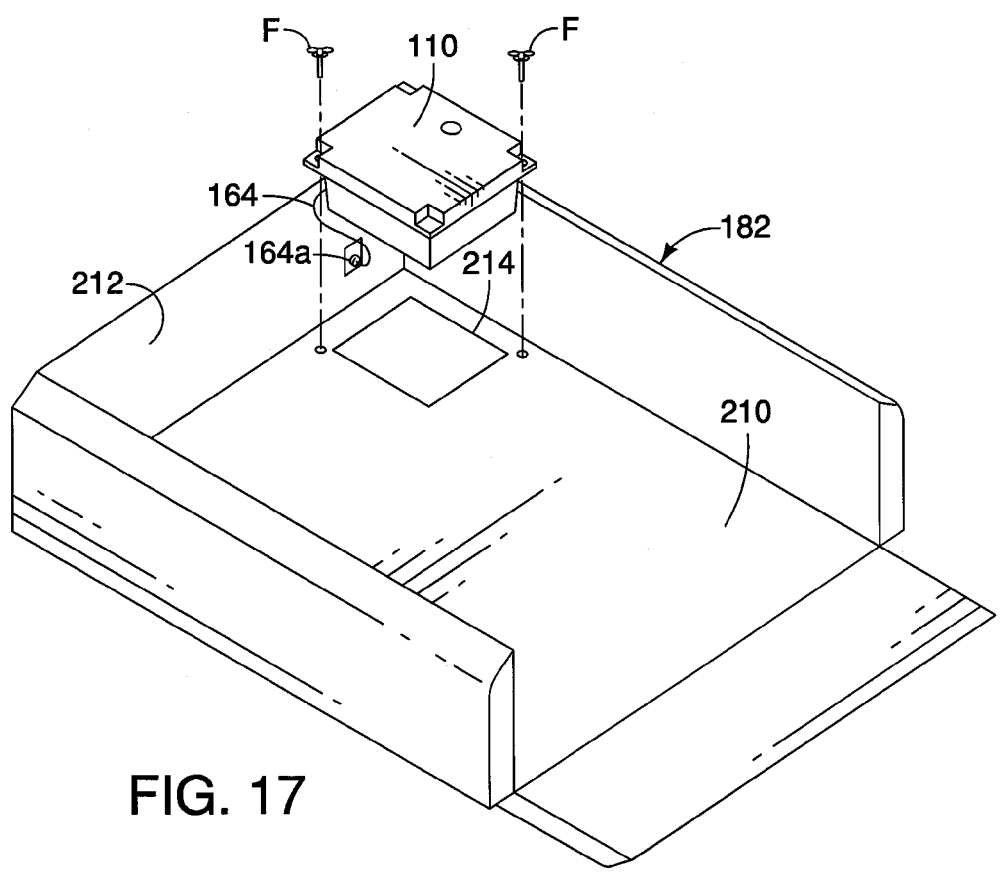
FIG. 17 is another perspective view of the cargo area structure similar to FIG. 16 showing the audio speaker cabinet installed to the cabinet receiving area within the cargo area structure in accordance with the third embodiment.

As shown in FIG. 17, the audio speaker cabinet 110 can be installed to the main surface 210 of the cargo area 182 via the fasteners F in a second orientation. The main surface 210 serves as a sealing wall to the non-sealed audio chamber 162 of the audio speaker cabinet 110. The connector 164a is plugged into the outlet 208 thereby powering the audio speaker cabinet 110. In this second orientation, the audio speaker cabinet 110 again operates as a band pass enclosure in the band pass enclosure mode.

Figure 18:
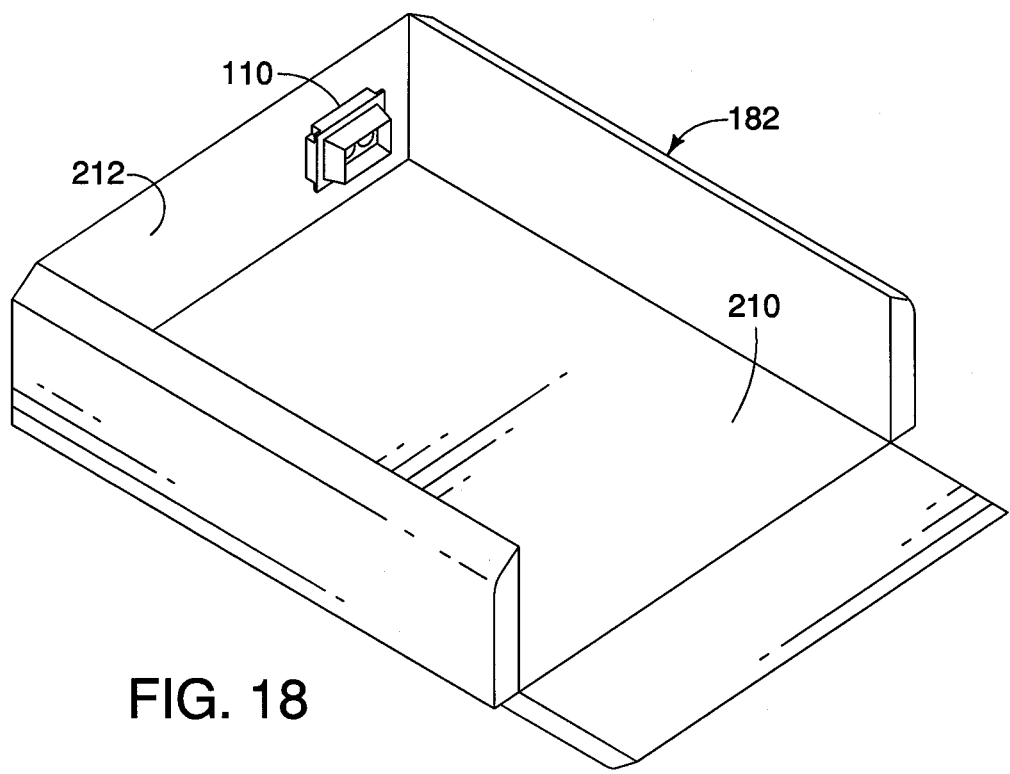
FIG. 18 is another perspective view of the cargo area structure of the vehicle similar to FIG. 16, showing the audio speaker cabinet installed to a second cabinet receiving area within the cargo area structure such that the audio speaker cabinet operates as a loudspeaker in accordance with the third embodiment.

As shown in FIG. 18, the audio speaker cabinet 110 can be installed to the upright wall 212 of the cargo area 182 in a third orientation. The audio speaker cabinet 110 is installed such that the non-sealed audio chamber 162 is open to the cargo area 182. The connector 164a is again plugged into the outlet 208 thereby powering the audio speaker cabinet 110. In this third orientation, the audio speaker cabinet 110 operates as a loudspeaker in the loudspeaker mode.

Figure 19:
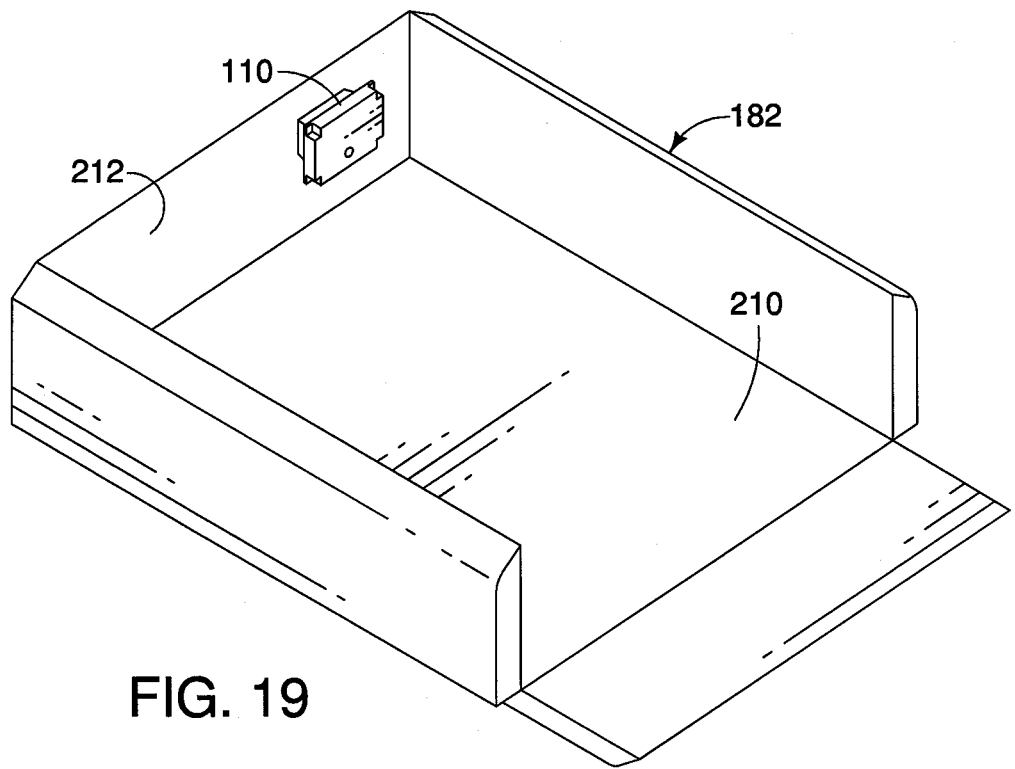
FIG. 19 is another perspective view of the cargo area structure of the vehicle similar to FIG. 16 showing the audio speaker cabinet installed to the second cabinet receiving area within the cargo area structure such that the audio speaker cabinet operates as a band pass enclosure in accordance with the third embodiment.

As shown in FIG. 19, the audio speaker cabinet 110 can be installed to the upright wall 212 of the cargo area 182 in a fourth orientation. The upright wall 212 serves as a sealing wall to the non-sealed audio chamber 162 of the audio speaker cabinet 110. The connector 164a is again plugged into the outlet 208 thereby powering the audio speaker cabinet 110. In this third orientation, the audio speaker cabinet 110 again operates as a band pass enclosure in the band pass enclosure mode.

Figure 20:
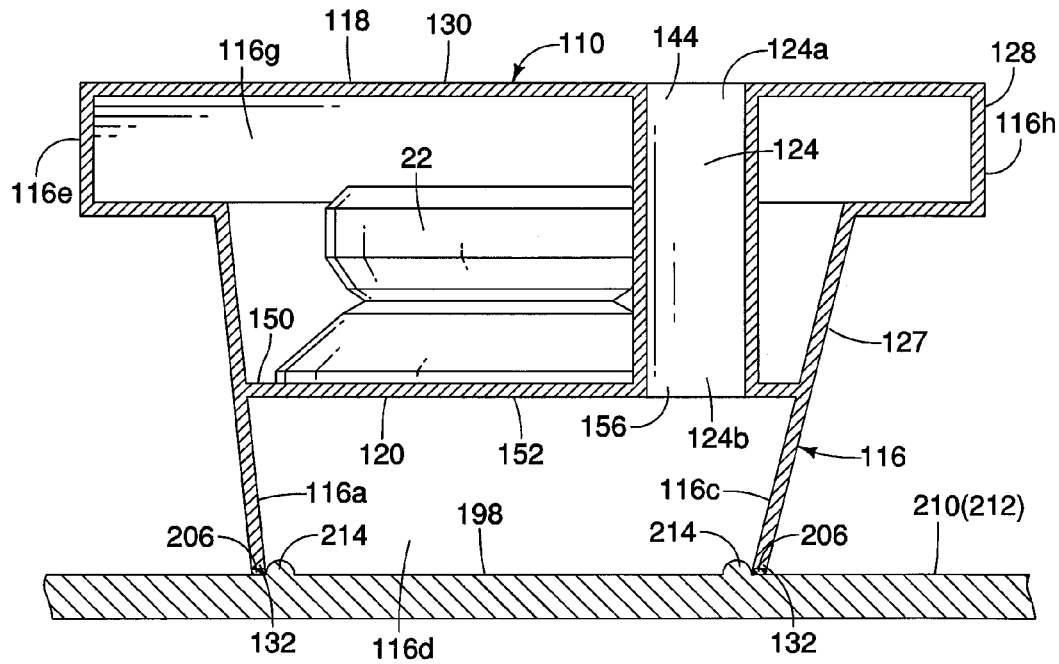
FIG. 20 is a side cross-sectional view of the cargo area structure and the audio speaker cabinet depicted in FIGS. 17 and 19 showing a surface of the cargo area structure serving as a sealing wall in accordance with the third embodiment.

As shown in FIG. 20, the upright wall 212 (and the main surface 210) of the cargo area 182 includes an embossed section 214, similar to the embossed section 204. The embossed section 214 conforms to the shape of an inner edge of the second end 132 of the side wall structure 116 of the audio speaker cabinet 110. A seal 206 is inserted between the second end 132 and the sealing wall surface 198 along an outer perimeter of the embossed section 214. The seal 206 can be attached to the second end 132 or can be attached to the upright wall 212 (or the main surface 210). The seal 206 ensures an air tight seal between the upright wall 212 (or the main surface 210) and the second end 132 of the side wall structure 116 of the audio speaker cabinet 110. Thus, when the audio speaker cabinet 110 is installed to the cargo area 182, the non-sealed audio chamber 162 is sealed in either of the second and/or fourth orientation. Consequently, with the audio speaker cabinet 110 installed in the second and/or fourth orientation to the cargo area 182 and the audio speaker cabinet 110 operates as a band pass enclosure in the band pass enclosure mode providing a narrow frequency audio band, as indicated in FIG. 4.

Figure 21:
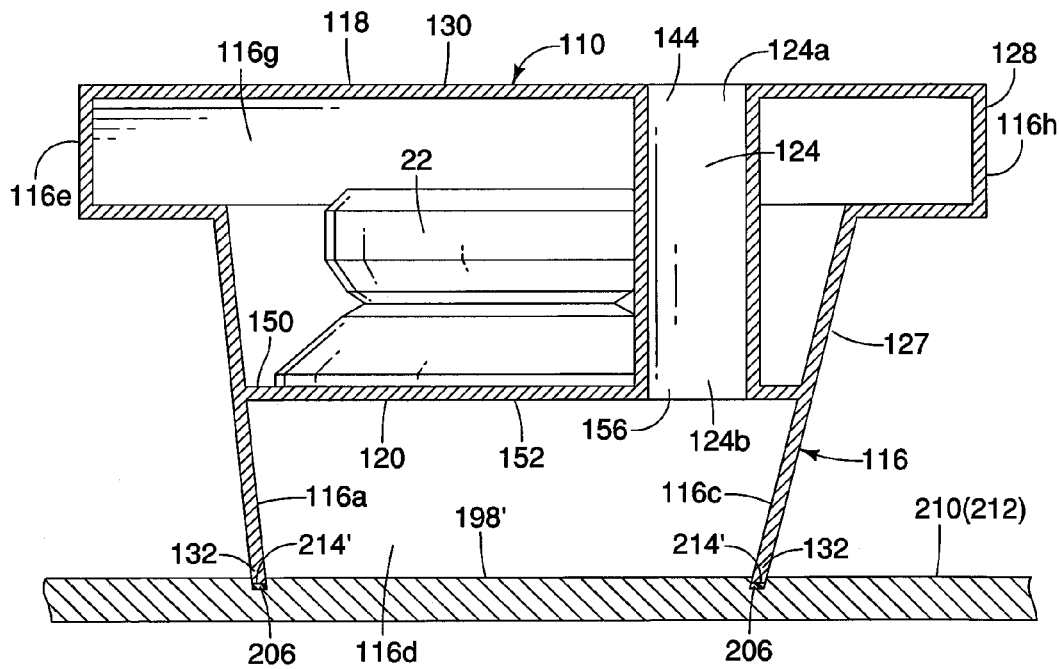
FIG. 21 is another side cross-sectional view of the cargo area structure and the audio speaker cabinet depicted in FIGS. 17 and 19 with a surface of the cargo area structure serving as a sealing wall in accordance with a modification to the third embodiment.

FIG. 21 shows a slight modification to the cargo area 182. Specifically, the upright wall 212 (and the main surface 210) of the cargo area 182 can be modified to yield a sealing wall surface 198' that includes a recess 214' that replaces the embossed section 214. The recess 214' is dimensioned to receive the second end 132 of the side wall structure 116 of the audio speaker cabinet 110. The seal 206 is inserted into the recess 214' with the second end 132 of the side wall structure 116 of the audio speaker cabinet 110 also installed into the recess 214'. In this modification, the audio speaker cabinet 110 installed in the second and/or fourth orientations to the cargo area 182 such that the audio speaker cabinet 110 operates as a band pass enclosure in the band pass enclosure mode providing a narrow frequency audio band, as indicated in FIG. 4.

In each of the embodiments, the second end 32 of the first and second embodiments and the second end 132 of the third embodiment, serves as a loudspeaker opening when no sealing wall is present.

In the depicted embodiments, the sealing walls, such as the sealing wall 26, the sealing wall surface 198, and the main surface 210 and the upright wall 212 of the cargo area 182 are all planar surfaces that engage the second end 132 (and second end 32) of the side wall structure 116 (and the side wall structure 16).

The various elements of the vehicle 112, other than audio speaker cabinet 10 and 110 and the various sealing wall surfaces described above, are conventional components that are well known in the art. Since various elements of the vehicle 112 are well known in the art, these structures will not be discussed or illustrated in detail herein. Rather, it will be apparent to those skilled in the art from this disclosure that the components can be any type of structure that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the audio speaker cabinet. Accordingly, these terms, as utilized to describe the present invention should be interpreted relative to a vehicle equipped with the audio speaker cabinet.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle audio assembly comprising:
   a storage structure having an interior surface that defines a cabinet receiving space and a sealing wall; and
   an audio driver cabinet configured for movement between a first orientation within the storage structure and a second orientation outside the storage structure, the audio driver cabinet including:
   a side wall structure having a side interior surface, a first end and a second end;
   a first wall fixed to the first end of the side wall structure and having an interior surface and an exterior surface;
   a second wall having a first surface and a second surface with a speaker opening extending from the first surface to the second surface, the second wall being fixedly attached to the side interior surface of the side wall structure spaced apart from and located between the first end and the second end of the side wall structure, with a first portion of the side wall structure, the interior surface of the first wall and the first surface of the second wall defining a first audio chamber, and with a second portion of the side wall structure and the second surface of the second wall at least partially defining a second audio chamber that is open at the second end of the side wall structure; and
   a sound driver fixed to the second wall covering the speaker opening, such that with the audio driver cabinet in the first orientation within the storage structure, the second end of the side wall structure contacts the sealing wall of the storage structure at least partially sealing the second audio chamber, and with the audio driver cabinet in the second orientation outside the storage structure, the second audio chamber defines a loudspeaker opening.

2. The vehicle audio assembly according to claim 1, further comprising
   a port structure that extends from a first port opening in the first wall to a second port opening in the second wall, the port structure extends through the first audio chamber with an interior of the port structure being sealed from the first audio chamber, the port structure defining a loudspeaker opening that is open to the second audio chamber and to the exterior surface of the first wall.

3. The vehicle audio assembly according to claim 2, wherein
   the first audio chamber is a sealed audio chamber and the second audio chamber is a ported audio chamber with the audio driver cabinet in the first orientation.

4. The vehicle audio assembly according to claim 1, wherein
   the storage structure further includes a lid that covers the cabinet receiving space of the storage structure.

5. The vehicle audio assembly according to claim 1, wherein
   the storage structure is a box-like enclosure attached to a floor within a passenger compartment of a vehicle.

6. The vehicle audio assembly according to claim 5, wherein
   the storage structure includes a vehicle seat that covers the audio driver cabinet with the audio driver cabinet in the first orientation within the storage structure.

7. The vehicle audio assembly according to claim 6, wherein
   the sealing wall of the storage structure is positioned adjacent to the floor, and with the audio driver cabinet in the first orientation within the storage structure, the second audio chamber is positioned above the sealing wall, the first audio chamber is positioned above the second audio chamber, and the seat is positioned above the first audio chamber.

8. The vehicle audio assembly according to claim 1, further comprising
   a second storage structure spaced apart from the storage structure and
   the audio driver cabinet is configured for movement to a third orientation within the second storage structure.

9. The vehicle audio assembly according to claim 8, wherein
   the storage structure is within a passenger compartment of a vehicle, and the second storage structure is within a cargo area of a vehicle.

10. The vehicle audio assembly according to claim 1, wherein
    the storage structure is within a cargo area of a vehicle.

11. The vehicle audio assembly according to claim 1, wherein
    the interior surface of the storage structure has a shape that is complimentary to the side wall of the audio driver cabinet.

12. A vehicle body structure comprising
    a first storage structure having a first cabinet receiving space and a first sealing wall;
    a second storage structure spaced apart from the first storage structure having a second cabinet receiving space and a second sealing wall; and
    an audio driver cabinet configured for movement between a first orientation within the first storage structure and a second orientation within the second storage structure, the audio driver cabinet including:
    a side wall structure having a side interior surface, a first end and a second end;
    a first wall fixed to the first end of the side wall structure and having an interior surface and an exterior surface;
    a second wall having a first surface and a second surface with a speaker opening extending from the first surface to the second surface, the second wall being fixedly attached to the side interior surface of the side wall structure spaced apart from and located between the first end and the second end of the side wall structure, with a first portion of the side wall structure, the interior surface of the first wall and the first surface of the second wall defining a first audio chamber, and with a second portion of the side wall structure and the second surface of the second wall at least partially defining a second audio chamber that is open at the second end of the side wall structure;
    a port structure that extends from the second audio chamber to an exterior of the audio driver cabinet; and
    a sound driver fixed to the second wall covering the speaker opening, such that with the audio driver cabinet in the first orientation within the first storage structure, the second end of the side wall structure contacts the first sealing wall of the first storage structure at least partially sealing the second audio chamber, and with the audio driver cabinet in the second orientation within the second storage structure, the second end of the side wall structure contacts the second sealing wall of the second storage structure at least partially sealing the second audio chamber.

13. The vehicle body structure according to claim 12, wherein the audio driver cabinet includes an audio signal connector electrically connected to the sound driver, the first storage structure includes a first electrical outlet configured to receive the audio signal connector, and the second storage structure includes a second electrical outlet configured to receive the audio signal connector, the first electrical outlet and the second electrical outlet being connected to an audio system configured to provide an audio output that drives the sound driver.

14. The vehicle body structure according to claim 12, wherein the port structure extends through the first audio chamber and includes an interior that is sealed relative to the first audio chamber, the interior of the port structure being open to the second audio chamber and to the exterior of the audio driver cabinet.

15. The vehicle body structure according to claim 12, wherein the first audio chamber is a sealed audio chamber and the second audio chamber is a ported audio chamber with the audio driver cabinet in either of the first orientation and the second orientation.

16. The vehicle body structure according to claim 12, wherein the first audio chamber, the second audio chamber and the port structure define a band pass configuration when the audio driver cabinet is in the first orientation.

17. The vehicle body structure according to claim 16, wherein the first audio chamber, the second audio chamber and the port structure define a second band pass configuration when in the second orientation.

18. The vehicle body structure according to claim 12, wherein the audio driver cabinet is configured for movement to a third orientation outside of the first storage structure and the second storage structure, with the second end of the side wall disengaged to define a sound driver opening such that the audio driver cabinet defines a sealed enclosure configuration in the third orientation.

19. The vehicle body structure according to claim 12, wherein the first storage structure is a storage compartment under a seat within a passenger compartment of a vehicle and the second storage structure is a cargo area of the vehicle.

20. The vehicle body structure according to claim 19, wherein the cargo area is one of the following: a truck bed, a cabin wall and a passenger vehicle trunk.

* * * * *